United States Patent [19]

Castleberry

[11] Patent Number: 4,979,859

[45] Date of Patent: Dec. 25, 1990

[54] ARTICLE FOR FIXING ITEMS TO HARDENED SUBSTRATES

[76] Inventor: Junia Castleberry, Rte. 1 Box 1312, 7044 Bonaza Dr., Long Beach, Miss. 39560

[21] Appl. No.: 178,889

[22] Filed: Apr. 8, 1988

Related U.S. Application Data

[63] Continuation of Ser. No. 931,204, Nov. 16, 1986, abandoned.

[51] Int. Cl.$^5$ .............................................. F16B 15/08
[52] U.S. Cl. .................................... 411/452; 411/922; 16/16
[58] Field of Search ............... 411/440, 441, 452, 488, 411/489, 494, 922, 923; 16/16

[56] References Cited

U.S. PATENT DOCUMENTS

| | | | |
|---|---|---|---|
| 895,080 | 8/1908 | Eisenreich | 411/452 |
| 2,226,141 | 12/1940 | Sabo | 411/452 |
| 2,412,517 | 12/1946 | Klein | 411/452 |
| 4,755,091 | 7/1988 | Potucek et al. | 411/452 |

FOREIGN PATENT DOCUMENTS

| | | | |
|---|---|---|---|
| 1090389 | 10/1954 | France | 411/452 |
| 1286760 | 1/1962 | France | 411/452 |
| 1475762 | 2/1967 | France | 411/452 |
| 163664 | 8/1921 | United Kingdom | 411/494 |
| 483646 | 8/1938 | United Kingdom | 411/452 |

Primary Examiner—Neill R. Wilson
Attorney, Agent, or Firm—Alexander Norcross

[57] ABSTRACT

A fastener for attaching objects such as tow boards to hardened substrates such as a concrete floor is constructed in the form of a driven nail having a head. The shank of the nail is constructed of a plurality of symmetrical hardened prismatic edges, at least three being required for proper resistance to hammering loads. The edges extend from the outer periphery of the head to the driving point; the prisms are joined to form the central axis of the fastener.

The construction of the nail is such that all force from driving blows is contained and supported within one or more of the edges, preventing bending of the nail shank at the juncture of nail head and shank, and preventing deformation of the nail under the driving force of a hammer.

3 Claims, 1 Drawing Sheet

U.S. Patent     Dec. 25, 1990     4,979,859
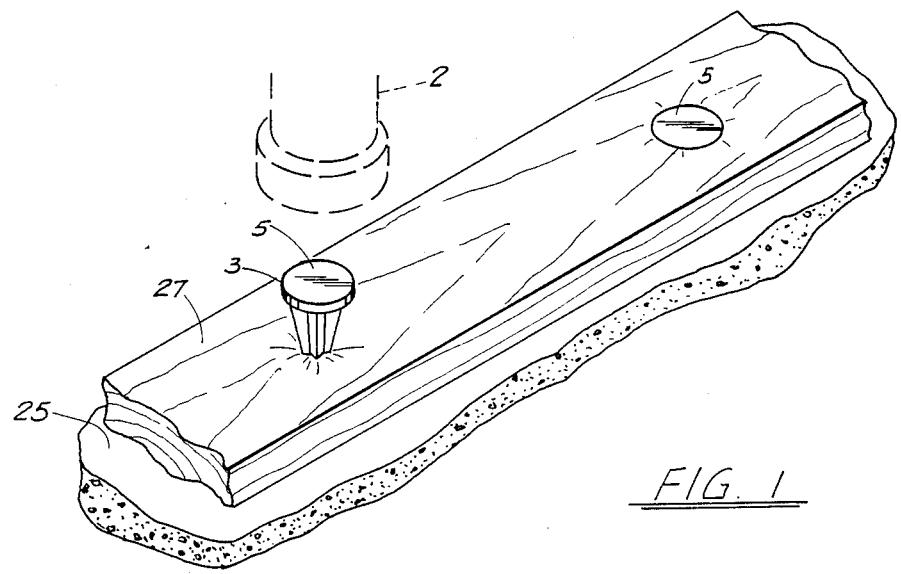
FIG. 1
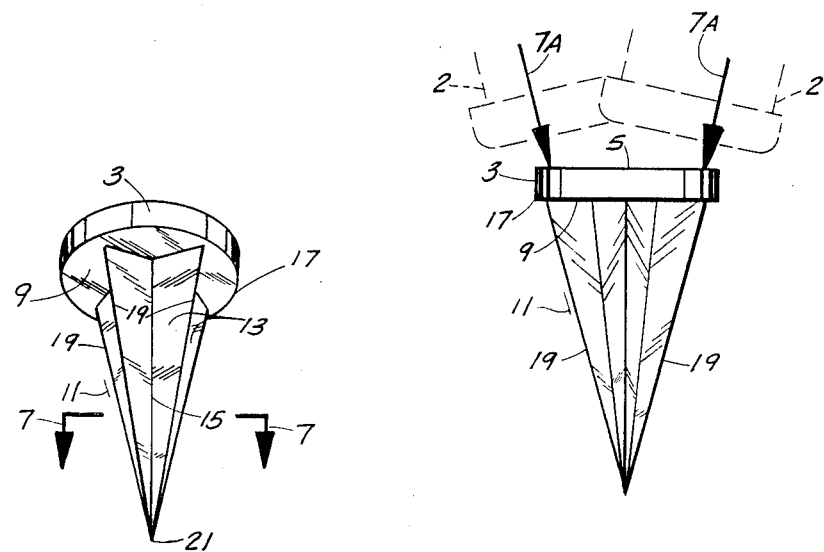
FIG. 2
FIG. 3
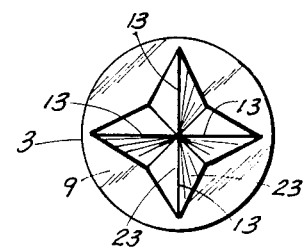
FIG. 4

ARTICLE FOR FIXING ITEMS TO HARDENED SUBSTRATES

This is a continuation of application Ser. No. 06/931,204, filed on Nov. 16, 1986, now abandoned.

BACKGROUND OF THE INVENTION

A common technique for providing an under-floor surface for the subsequent erection of housing is to provide a leveled, poured concrete slab as the floor member upon which a building is erected. This technique is in particularly widespread use in the field of housing. Various techniques are known for fastening major structural members such as studs and walls to such a surface. However, the growing desirability of indoor, wall to wall carpeting as a covering for such a floor has led to the universal adoption of the technique of using small furring strips which are equipped to accept staples for holding and securing a carpet and which in turn are fastened to the cement slab.

Because these strips must provide an edge fastening method for a carpet but not change the level or provide bulk under the carpet they are of necessity quite thin, being typically three-eighths of an inch thick, made out of soft wood so as to readily hold the vertically extending staples which secure the carpet. In order to prevent destruction of the furring strip, the fastening means for fixing the strip to the cement slab must of necessity be of limited cross-section area, as the displacement of the strip by the fastening means would otherwise split the strip. Thus it is a universal practice to use a very small casehardened nail to fasten the furring strip to the cement slab.

Recent adoption of new types of cement have produced extremely hard cement slabs, that resist application of typical casehardened nails of usual shape. As a result it is common to find in typical furring strips that the application of driving blow to the fastening nail results in the nail being bent or destroyed rather than in the nail penetrating the concrete. It is typically found that the nail fails at the joint of the head and the body for hammer driven nails, and it has been observed for power driven nails that often the entire nail body is bent in a u-shape and the nail is simply reversed and driven back up through the furring strip. In either case, no fastening effect occurs to the cement and the attempt to fasten the furring strip to the slab is a failure.

SUMMARY OF THE INVENTION

The purpose of this invention is to provide a new form of nail, of an improved shape, particularly adapted to provide a successful physically small nail capable of both penetrating and affixing a furring strip to a hardened cement slab. The particular shape of the nail has been developed so as to provide resistance to most of the bending forces which otherwise would cause failure in the nail, and at the same time to provide an improved penetration and gripping force between the nail and the cement into which it is driven.

While the following discussion, including the Detailed Description of the Preferred Embodiment, concentrates on a nail developed for affixing a furring strip to a hardened cement slab, it should be understood that the technique involved is suitable for fastening any fragile object to a rigid, hardened substrate, including brick, stone, or similar materials.

The nail of the improved form provides a driving head for accepting the blows of a driving hammer and for providing a fastening force and surface for the article to be affixed to the slab. The shank of the nail, however, consists of a plurality of essentially solid triangular members joined symmetrically about the driving axis of the nail, forming at one end the point of the nail and at the other end a shoulder support extending out essentially to the outer extent of the driving head. The outer edges of each of the triangular members creates a triangular entering face that is essentially straight sided so as to provide a uniform displacement and smooth entry as the nail is driven to within the cement. Each of the triangular faces is of a relatively narrow cross-section, chosen to be wide enough to provide adequate force to resist the deformation forces of the blows, but narrow enough so as to enter the cement in a holding manner without chipping away a hole therein. Thus the relatively blunt entry angle encountered in prior art cement star drills is not seen in the design of nail entry faces.

In cross-section each of the triangular sections, of which there must be at least three, are symmetrically disposed about the central driving axis so as to avoid any bias or deflection forces as the nail is driven; such forces would occur were the nail to have non-symmetrical disposition of the triangular driving edges. At least three such triangular edges are required as two edges would simply act as a splitting plane, and would tend to split the article to be fastened. More importantly, if only two such relatively thin edges existed there would be limited resistance to bending force transverse to the plane of the two faces, and the failure problem of prior art nails would still exist.

It is, therefore, a purpose of this invention to provide a physically small nail shape which can serve to fasten an article to an extremely hard substrate with increased resistance to bending or collapse while being hammered against the substrate.

It is a further object of this invention to provide a nail capable of fastening articles to a hardened substrate, which may be provided of relatively small physical dimensions, and yet will resist collapsing forces while driven.

It is a further object of this invention to provide an improved fastening means for affixing an article to a hardened substrate.

These and other objects of the invention can be more clearly seen from the Detailed Description of the Preferred Embodiment which follows.

BRIEF DESCRIPTION OF THE DRAWINGS

FIG. 1 shows the article of the current invention being used to fasten a figurative furring strip to a concrete subsurface.

FIG. 2 shows an angled view and embodiment of the article of the current invention, directed downwardly in its driving direction.

FIG. 3 shows a side view of an embodiment of the current invention, depicting the typically encountered varying hammering forces imposed upon such an article for driving.

FIG. 4 depicts a bottom view of an embodiment of the article of the invention.

DETAILED DESCRIPTION OF THE PREFERRED EMBODIMENT

Referring to the figures as illustrated in the drawings, the article 1 or nail of the current invention may best be seen by reference to FIG. 2 and FIG. 4. Article 1 has a driving head 3, adapted for receiving driving blows upon a top face 5 for imparting motion to nail 1. For the purposes of this discussion we will arbitrarily define the motion or direction of driving force 7 as being downward.

This downward direction 7 thus defines a bottom face 9 of head 3. Extending downward in direction 7 from bottom face 9 is shank 11 of particular and unique construction to provide the superior performance of nail 1. Shank 11 comprises a plurality, but at least three, solid triangular penetrating prismatic sections 13 radially and symmetrically disposed about downward axis 15 of the nail 1. The prismatic sections 13 are fixedly attached to bottom face 9 of the nail, as a base, and extend from axis 15 radially outwardly to a point substantially adjacent outer circumference 17 of the nail head 3. Each of the penetrating prisms 13 extend along a substantially straight outer edge 19 to form penetrating point 21 which is the point of nail 1.

An outer edge 19 of each section is formed at an angle defined by the intersection of prism faces 23, which for clarity of depiction are numbered and illustrated only in a typical example in FIG. 4, but which can readily be seen in the other figures of the depiction.

Four prisms 13 are shown in the illustrated embodiment. Referring to FIG. 3, the prisms provide direct support against the blows of hammer 2 upon head 3, even though hammer 2 typically in use will varying in angle of contact at the strike thus creating varying angles of driving force 7A. It can be seen, however, that by the particular construction of shank 11 that the driving forces 7A are contained within and along the solid support of one or more prisms 13 which in turn substantially resist the bending forces which otherwise would tend to destroy the nail.

Outer edges 19 are substantially straight so that in penetrating furring strip 27 and substrate 25 there is an essentially linear increase in contact between nail 1 and the penetrated articles and there are thus no significant changes in the direction of the resisting force upon the nail as it is driven. Again the straight edges 19 serve to reduce the bending forces which are attempting to destroy or deflect the nail 1 as it is driven into the substantially unyielding substrate 25. The penetrating prisms 13 are symmetrically disposed in a radial sense about axis 15 so as to provide uniform resistance to deflection and bending at all angles radially about axis 15. It is for this reason that at least three prismatic edges 13 are required; with only two such edges, there would be a direction in which there was substantially less resistance to bending or alternatively there would be a biased resistance tending to deflect the nail due to the non-radial symmetry of positioning of the penetrating edges.

The use of solid triangular penetrating faces 13 also serves to reduce the overall volume of displaced material as nail 1 is driven into furring strip 27 and substrate 25. This serves two purposes. As is known in the art, furring strip 27 must be a relatively thin strip in terms of depth due to its placement under a carpet as a supporting member and the concomitant requirement that the carpet exhibit a smooth surface with no rises or protruding bulges due to excessive thickness of strip 27. Such a strip, especially when made of soft wood as is typical in the industry, is extremely susceptible to splitting. The particular cross-section of shank 11 serves to minimize cross-sectional area of nail 1, and thus reduces splitting.

In addition, substrate 25 by definition is a rigid non-deforming material. It is believed that the open space between prism faces 23 serves to provide an area into which the displaced broken material created by the penetration of nail 1 into substrate 25 may more readily be displaced. It is further believed that this debris, compacted by the expanding triangular shape of penetrating prisms 13 serves to aid in gripping and holding nail 1 in place when fully driven.

It should thus be apparent from the description given of the particular construction of shank 11 of nail 1 that this provides a nail of great utility in fastening to rigid non-deformable substrates. The nail is of much greater strength and resistance to bending and deflection than the solid shank nails of the prior art; by providing essentially straight penetrating edges extending from the point to the outer periphery of the driving head, the nail provides a smooth even resistance to driving and a substantial resistance to bending and deflection forces.

While the preferred embodiment of the invention has discussed a relatively small version of the nail adapted particularly to fastening furring strips to concrete substrates, it should be seen that the invention embody's the wider range of equivalents as claimed.

I claim:

1. A fastener, for fastening an article to a hardened substrate, comprising:
   a. a driving head member having a surface for receiving a directed driving force defining an outer periphery thereof;
   b. a penetration shank perpendicularly attached to said driving head member thereto along an axis in the direction of said driving force;
   c. said shank further comprising:
      1. at least three but less than five penetrating wedges, perpendicularly extending from said axis, each wedge having a hardened, straight, outer penetrating edge extending from a point substantially adjacent to the outer periphery of said driving head member to a tip point defined on said axis;
      2. said wedges meeting at inner edges, forming a shank tapered from said tip point to said driving head;
      3. said outer penetrating edges forming an angle greater than fifteen degrees.

2. An article for fastening an intermediate strip to a hardened substrate comprising:
   a. a driven head;
   b. three of four triangular penetrating members, perpendicularly affixed to a first side of said driving head; and
   c. said triangular penetrating members being fixed joined along an axis perpendicular to said head;
   d. said members being symmetrically displaced, radially with respect to one another about said axis; and
   e. each said triangular member having a substantially straight, hardened outer edge fixedly connected from an outer edge of said driven head extending to form a penetrating point;
   f. said triangular members meeting at inner edges, forming a linearly increasing taper from said penetrating point to said driving head;
   g. said penetrating point forming an angle having a taper of greater than fifteen degrees.

3. A furring strip, of the kind having carpet holding means and means for fastening to a subsurface, said means for fastening comprising:
   a. a driving head member having a surface for receiving a directed driving force defining an outer periphery thereof;

b. a penetration shank perpendicularly attached to said driving head member thereto along an axis in the direction of said driving force;
c. said shank further comprising:
  1. at least three but less than five penetrating wedges, perpendicularly extending from said axis, each wedge having a hardened, straight, outer penetrating edge extending from a point substantially adjacent to the outer periphery of said driving head member to a tip point defined on said axis;
  2. said wedges meeting at inner edges, forming a shank tapered from said tip point to said driving head;
  3. said outer penetrating edges forming an angle greater than fifteen degrees.

* * * * *